United States Patent Office
3,499,913
Patented Mar. 10, 1970

3,499,913
4-OXA STEROIDS AND PROCESS
Robert Joly, Montmorency, Julien Warnant, Neuilly-sur-Seine, and Jean Joly, Clichy-sous-Bois, France, assignors to Roussel-UCLAF, Paris, France, a corporation of France
No Drawing Filed Jan. 3, 1968, Ser. No. 695,364
Claims priority, application France, Jan. 6, 1967, 90,264, 90,265
Int. Cl. C07d 101/00; C07c 167/02, 169/10
U.S. Cl. 260—345.2
25 Claims

ABSTRACT OF THE DISCLOSURE

This invention relates to a 4-oxa steroid of the formula

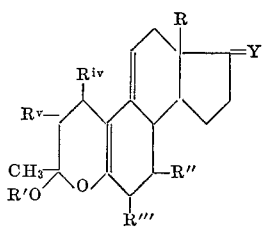

where R and R' represent lower alkyl, R" and R'" represent a member selected from the group consisting of hydrogen, α-lower alkyl and β-lower alkyl, $R^{iv}$ and $R^v$ represent a member selected from the group consisting of hydrogen, α-methyl and β-metyhl, Y represents a member selected from the group consisting of O,

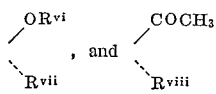

wherein $R^{vi}$ represents a member selected from the group consisting of hydrogen, lower alkyl and the acyl of an organic carboxylic acid having 1 to 7 carbon atoms, $R^{vii}$ represents a member selected from the group consisting of hydrogen, lower alkyl, lower alkenyl, lower alkylnyl and lower haloakynyl, and $R^{viii}$ represents a member selected from the group consisting of hydrogen and methyl. These compounds are useful as intermediates in the preparation of known physiologically active steriods, particularly due to the stability of the A ring allowing chemical reactions to be performed on the C and D rings.

CLAIM OF PRIORITY

The right of priority under 35 USC 119 is hereby claimed, based on the corresponding French patent applications P.V. 90,264 and P.V. 90,265, both filed Jan. 6, 1967, on our behalf.

THE PRIOR ART

3 - alkoxy - 19-nor-3-methyl-4-oxa-$\Delta^{5(10)}$-[9β]-androstene-17β-ol and its derivatives in the 17 position have previously been reported in French Patent 1,366,725. However, these compounds are not suitable for the preparation of steroid compounds of natural configuration due to the inverted configuration on the 9 carbon atom. Moreover, they are prepared by a different method.

OBJECTS OF THE INVENTION

An object of the invention is the obtention of a 4-oxa steroid intermediate having a stable A ring useful in steroid synthesis for the further reactions on the C and D rings.

Another object of the invention is the obtention of a 4-oxa steroid of the formula

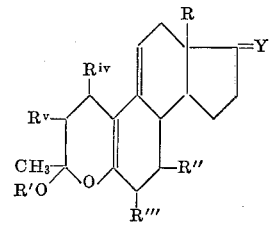

wherein R and R' represent lower alkyl, R" and R'" represent a member selected from the group consisting of hydrogen, α-lower alkyl and β-lower alkyl, $R^{iv}$ and $R^v$ represent a member selected from the group consisting of hydrogen, α-methyl and β-methyl, Y represents a member selected from the group consisting of O,

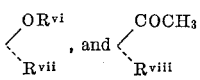

wherein $R^{vi}$ represents a member selected from the group consisting of hydrogen, lower alkyl and the acyl of an organic carboxylic acid having 1 to 7 carbon atoms, $R^{vii}$ represents a member selected from the group consisting of hydrogen, lower alkyl, lower alkenyl, lower alkynyl and lower haloalkyny, and $R^{viii}$ represents a member selected from the group consisting of hydrogen and methyl.

A further object of the invention is the development of a process for the production of the above 4-oxa steroid which comprises the steps of reacting a 3,5-dioxo-4,5-seco-$\Delta^9$-steroid of the formula

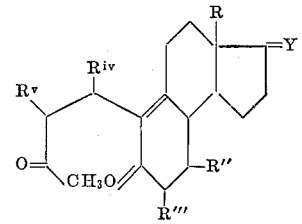

wherein R represents lower alkyl, R" and R'" represent a member selected from the group consisting of hydrogen, α-lower alkyl and β-lower alkyl, $R^{iv}$ and $R^v$ represent a member selected from the group consisting of hydrogen, α-methyl and β-methyl, Y represents a member selected from the group consisting of O,

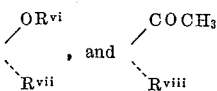

wherein $R^{vi}$ represents a member selected from the group consisting of hydrogen, lower alkyl and the acyl of an organic carboxylic acid having 1 to 7 carbon atoms, $R^{vii}$ represents a member selected from the group consisting of hydrogen, lower alkyl, lower alkenyl, lower alkynyl and lower haloalkynyl, and $R^{viii}$ represents a member methyl, with a lower alkyl orthoformiate of the formula $HC(OR')_3$ wherein R' represents lower alkyl, in the presence of an acid agent and recovering said 4-oxa steroid.

A yet further object of the invention is the development of processes for the obtention of known steroids through the intermediary of the above 4-oxa steroid.

These and other objects of the present invention will become more apparent as the description thereof proceeds.

DESCRIPTION OF THE INVENTION

These objects have now been achieved in the discovery of novel 4-oxa steroids of the general Formula I:

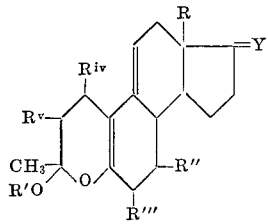

wherein here and thereafter.
R is a lower alkyl radical,
R' is a lower alkyl radical,
R'' is a lower alkyl radical or a hydrogen atom,
R''' is a lower alkyl radical or a hydrogen atom,
$R^{iv}$ is the methyl radical or a hydrogen atom,
$R^v$ is the methyl radical or a hydrogen atom,
Y is one of the groupings:

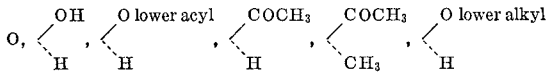

or

saturated or unsaturated, substituted or unsubstituted hydrocarbon,
$R^{vi}$ being selected from the group consisting of a hydrogen atom, a lower alkyl radical and a lower acyl radical.

The substituents R'', R''', $R^{iv}$ and $R^v$ can be in the alpha or beta configuration. The lower acyl can be the acyl of an organic carboxylic acid having 1 to 7 carbon atoms and particularly benzoyl and lower alkanoyl such as acetoxy.

More particularly the 4-oxa steroids of the invention are those steroids of the general Formula I, wherein R is a lower alkyl radical comprising from 1 to 4 carbon atoms, R' is a lower alkyl radical comprising 1 or 2 carbon atoms, R'' is a hydrogen atom or a methyl, R''' is a hydrogen atom or a methyl, $R^{iv}$ is a hydrogen atom or a methyl, $R^v$ is a hydrogen atom or a methyl. Preferred are the 4-oxa steroids of the formula

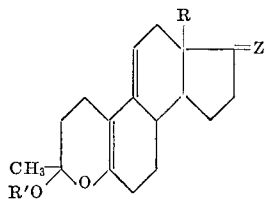

wherein R is lower alkyl and especially methyl, ethyl, propyl or butyl, R' is lower alkyl and especially methyl or ethyl, and Z is O,

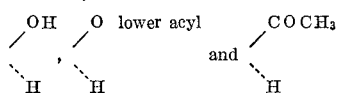

The novel compounds of Formula I are valuable intermediates for the preparation of steroid derivatives. They have an advantage in that they practically do not exhibit any reactive function at the level of the A ring at the time of certain substitutions or conversions at the level of the C and D rings, which will be described later on. These compounds of Formula I have a good stability in alkaline medium. However, the opening of their pyranic ring is easily effected in acid medium with formation of the corresponding 4,5-seco-3,5-diketonic derivatives, the cyclisation of which, when performed according to the described methods, allows the A ring to be completed in normal steroid configuration.

Some 4-oxa-steroids are already known (see for example the French Patent 1,366,725).

However, these compounds are not suitable for the preparation of steroid compounds of natural configuration, due to the inversion of configuration which they exhibited at the level of the carbon in the 9 position as discussed above. Moreover, they were prepared according to a method (the catalytic hydrogenation in an acid medium of 3,5-dioxo-4,5-seco-$\Delta^9$ steroids in the presence of a lower aliphatic alcohol, the latter determining the nature of the 3-alkoxy grouping of the formed pyranic derivative), which was entirely different to that used to obtain the compounds of Formula I.

Now, it has been found, and the process of the invention is based thereon, that 4,5-seco-3,5-diketonic steroid derivatives having a 9, 10 double bond, when reacted with a lower alkyl ortho-formiate, in the presence of an acid agent, provided the derivatives with pyranic structure of Formula I and that the reaction proceeds gently and gives satisfactory yields.

Thus, the compounds of the general Formula I offer another advantage in that their access is easy, whereas, as has previously been reported, a 1,5-dione reacted in either an acid medium or in an alkaline medium gives rise generally to the formation of a cyclohexenic ring having a conjugated ketone function.

The process for the preparation of the 4-oxa steroids of Formula I comprises the reaction of a 3,5-dioxo-4,5-seco-$\Delta^9$ steroid of the general Formula II

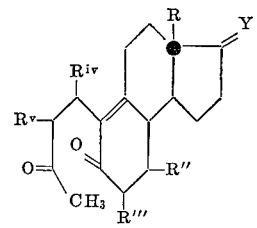

(II)

with a lower alkyl orthoformiate of the general Formula III

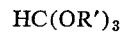

in the presence of an acid agent and the desired compound is isolated.

Preferably, the lower alkyl orthoformiate used in the process of the invention is methyl or ethyl orthoformiate and the reaction is conducted in the presence of a catalytic amount of a strong acid, such as para-toluene sulfonic acid, methane sulfonic acid, perchloric acid, or sulfuric acid. The choice of the orthoformiate determines the nature of the alkoxy grouping of the resulting pyranic derivative. Thus, methyl orthoformiate leads to the methoxy-pyranic derivative, whereas ethyl orthoformiate provides the corresponding ethoxylated compound. The condensation with orthoformiate is preferably effected in a polar organic solvent such as methanol, ethanol or dioxane, and it occurs quickly at temperatures approximating room temperature.

As is mentioned above, the novel 4-oxa steroids of the general Formula I are valuable intermediates for the preparation of steroid derivatives. The ketonic functions in the 3 and 5 positions are protected and do not undergo reaction while substitutions are made on the C and D rings. This has led to a general and unobvious method of producing the said steroids.

For example, it has been ascertained, that the 4-oxa steroids of the general Formula I are easily suitable for the introduction, by bromination and dehydrobromination, of the 11, 12 double bond, so as to give thus, after closing the A ring, a 4,9,11-triene steroid. They are also suitable for the introduction of a substituent in the 17α position, so as to prepare monoene, diene or triene steroids alkylated, ethynylated, etc., in this position.

A few cases of utilization of these compounds of Formula I in the synthesis of physiologically active derivatives are described hereinafter. It is evident that this utilization is a part of the present invention.

A preferred use of a compound of the Formula I consists in preparing 17β-benzoyloxy-4,5-seco-Δ$^{9,11}$-estra-diene-3,5-dione. To obtain this compound, a 3-methyl-3-alkoxy-4-oxa-17β-benzoyloxy-Δ$^{5(10),9(11)}$ - estradiene is selectively brominated in the 11 position. The 11-bromo-17β-benzoyloxy-4,5-seco-Δ$^9$-estrene-3,5-dione formed is dehydrobrominated and the desired 17β-benzoyloxy-4,5-seco-Δ$^{9,11}$-estradiene-3,5-dione is obtained. This compound is then cyclised in alkaline medium, according to the French Patent 1,380,414 so as to form 17β-benzoyloxy-Δ$^{4,9,11}$ - estratriene - 3 - one, which is endowed with a high anabolising and androgenic activity.

The 3 - methyl - 3 - alkoxy - 4 - oxa - 17β - benzoyloxy-Δ$^{5(10),9(11)}$-estradiene used is preferably the 3-ethoxylated derivative.

Bromine is advantageously used to effect the selective bromination in the 11 position of 3 - methyl - 3 - ethoxy-4-oxa-17β-benzoyloxy-Δ$^{5(10),9(11)}$-estradiene, and it is convenient to operate in a polar organic solvent, such as dimethylformamide, in the presence of a basic agent, such as alkali metal acetate. The further dehydrobromination of the 11-brominated derivative is conveniently effected in the presence of a basic agent, such as lithium carbonate and of a lithium halide, such as the bromide. The reaction is conducted in a polar organic solvent, such as dimethylformamide.

Another important use of a compound of the Formula I is the preparation of 17α-ethynyl - 4,4-seco - Δ$^9$ - estrene - 17β-ol-3,5-dione. For this purpose, an ethynylation agent is reacted in basic medium with a 3-methyl-3-alkoxy - 4 -oxa-Δ$^{5(10),9(11)}$-estradiene - 17 - one. The 3-methyl-3-alkoxy - 4 - oxa - 17α-ethynyl-Δ$^{5(10),9(11)}$-estradiene - 17β-ol-formed is hydrolysed in aqueous acid medium to obtain 17α-ethynyl - 4,5 - seco-Δ$^9$-estrene-17β-ol-3,5-dione.

This compound is easily converted into 17α-ethynyl-Δ$^{4,9}$-estradiene - 17β-ol-3-one by applying the process described in the French Patent 1,497,593. This process involves reacting the compound with a basic cylisation agent in anhydrous medium or an acid cyclisation agent in the presence of a small amount of water.

From the 17α-ethynyl - Δ$^{4,9}$-estradiene-17β-ol-3 - one prepared in this way, there is obtained, according to the process of U.S. Patent 3,136,790, 17α-ethynyl-Δ$^{5(10)}$-estrene-17β - ol - 3 - one, which is a well known progestative agent.

The 3 - methyl - 3 - alkoxy - 4 - oxa-Δ$^{5(10),9(11)}$-estradiene-17-one used is preferably the 3 - ethoxylated derivative.

To ethynylate the 3 - methyl - 3 - ethoxy - 4 - oxa-Δ$^{5(10),9(11)}$-estradiene - 17 - one, an alkali metal acetylide in an aprotic medium (for example toluene or benzene) may be conveniently used. The subsequent hydrolysis is advantageously effected in aqueous medium with a strong acid, such as hydrochloric acid and in a polar solvent or a mixture of polar solvents.

Another important use of a compound having the Formula I consists in preparing 13β-ethyl-17α-ethynyl-Δ$^{4,9}$-gonadiene - 17β-ol-3-one. For the preparation of this compound, an ethynylation agent is reacted, in basic medium, with a 3 - methyl-3-alkoxy-4-oxa - 13β-ethyl-Δ$^{5(10),9(11)}$-gonadiene-17-one. The 3 - methyl - 3 - alkoxy-4-oxa-13β - ethyl - 17α-ethynyl-Δ$^{5(10),9(11)}$-gonadiene-17β-ol formed is hydrolysed in acid medium and there is obtained 13β-ethyl-17α-ethynyl - 4,5 - seco-Δ$^9$-gonene-17β-3,5-dione.

This compound is easily converted into 13β-ethyl - 17α-ethynyl-Δ$^{4,9}$-gonadiene - 17β-ol-3-one by applying the process described in the French Patent 1,497,593. This process involves reacting the compound with a basic cylisation agent in anhydrous medium or an acid cyclisation agent, in the presence of a small amount of water.

Starting from the thus prepared 13β-ethyl-17α-ethynyl-Δ$^{4,9}$-gonadiene - 17β-ol-3-one and by applying the process of the U.S. Patent 3,136,790, 13β-ethyl-17α-ethynyl-Δ$^{5(10)}$-gonene - 17β - ol - 3 - one, which is a very active progestomimetic agent, is easily obtained.

The 3 - methyl - 3 - alkoxy - 4 - oxa - 13β-ethyl-Δ$^{5(10),9(11)}$-gonadiene - 17 - one, preferably used, is the 3-ethoxylated derivative.

The ethynylation of 3 - methyl - 3 - ethoxy - 4 - oxa-13β-ethyl - Δ$^{5(10),9(11)}$-gonadiene - 17 - one and the further hydrolysis of the formed ethynylated derivative are effected in an analogous way to that described above in the case of the corresponding 13β - methylated derivative.

Another important use of a compound of the general Formula I is in the preparation of 13β-ethyl-Δ$^{4,9,11}$-gonatriene - 3,17 - dione.

This product is a valuable intermediate in the synthesis of 4,9,11-gonatriene derivatives and this is particularly useful for the preparation of 13β-ethyl - 17α-ethynyl-Δ$^{4,9,11}$-gonatriene-17β-ol-3-one, which is a strongly active progestomimetic agent (see the Belgian Patent 679,368).

Until now, to obtain this compound, 13β-ethyl-4,5-seco-Δ$^9$-gonene - 17β - ol - 3,5-dione was cyclised into 13β-ethyl - Δ$^{4,9}$-gonadiene - 17β-ol-3-one, then after a previous protection of the ketone in the 3 position in the form of ketal, the alcohol in the 17 position was oxidized into a ketone, and, at the end of the process, the 11,12 double bond was introduced. See Belgian Patents 657,260 and 674,178 as well as U.S. patent application S.N. 517,061, filed Dec. 28, 1965, now Pat. No. 3,453,267.

Now, it has been found in the preparation of 13β-ethyl-Δ$^{4,9,11}$-gonatriene-3,17-dione, that it is advantageous to start from a 3-methyl - 3 - alkoxy - 4 - oxa-13β-ethyl-Δ$^{5(10),9(11)}$-gonadiene - 17 - one, which is selectively brominated in the 11 position with a bromination agent, and to dehydrobrominate the 11-bromo - 13β-ethyl-4,5-seco-Δ$^9$-gonene - 3,5,17 - trione by the action of a basic agent, 13β-ethyl-4,5-seco-Δ$^{9,11}$gonadiene - 3,5,17 - trione is obtained, which is cyclised by acting an alkaline agent in anhydrous medium and the desired 13β-ethyl-Δ$^{4,9,11}$-gonatriene - 3,17-dione is isolated.

The selected bromination in the 11 position of 3-methyl-3-alkoxy - 4 - oxa - 13β - ethyl - Δ$^{5(10),9(11)}$-gonadiene-17-one is effected by the action of N-bromosuccinimide and the reaction is conducted in a polar organic solvent, such as formamide or dimethylformamide.

The dehydrobromination of the 11-brominated derivative is advantageously effected in situ without isolating intermediately the brominated derivative from the reaction medium. The basic agent used to effect this dehydrobromination, is preferably lithium carbonate and it is advantageous to operate in the presence of a lithium halide, such as the chloride or bromide and in a polar organic solvent, such as formamide or dimethylformamide. When the dehydrobromination is effected in situ, it is convenient to proceed in the same solvent as that used for the bromination.

The alkaline agent used to effect the cyclisation of the A ring of 13β-ethyl-4,5-seco-Δ$^{9,11}$-gonadiene-3,5,17-trione is, for example, an alkali metal lower alkanolate or an alkali metal hydroxide and the reaction is conducted in an anhydrous medium. The actually preferred cyclisation agent is potassium hydroxide, which is used in a methanolic medium, but it is evident that other alkaline agents, such as caustic soda or an alkali metal lower alkanolate may also be suitable.

The following examples illustrate the invention both for the preparation of the pyranic alkoxy derivatives as for the applications of these derivatives for the preparation of physiologically active compounds. These examples, however, are not deemed to give to the invention any limitative character.

*Examples of the preparation of compounds of Formula I*

Example 1.—Preparation of 3-methyl-3-ethoxy-4-oxa-17β-benzoyloxy-Δ$^{5(10),9(11)}$-estradiene 20 gm. of 17β-benzoyloxy-4,5-seco-Δ$^9$-estrene-3,5-dione, a product described in French Patent No. 1,364,556 and in United States Patent No. 3,101,354, are introduced into 20 cc. of ethanol under an atmosphere of nitrogen. 0.005 gm. of para-toluene sulfonic acid is added. The mixture is stirred for 15 minutes at room temperature and 16 cc. of ethyl orthoformiate are introduced. The agitation is maintained for 2 hours at room temperature. Then the pH of the reaction medium is brought to 8.0 by adding triethylamine. The reaction mixture is poured into water and extracted with methylene chloride. The methylene chloride extracts are combined. The obtained organic solution is washed with water, dried and concentrated to dryness under reduced pressure and under an atmosphere of nitrogen to obtain 25.6 gm. of crude 3 - methyl - 3 - ethoxy-4-oxa-17β-benzoyloxy-Δ$^{5(10),9(11)}$-estradiene, containing ethyl orthoformiate.

As far as is known, this product is not described in the literature.

Example 2.—Preparation of 3-methyl-3-methoxy-4-oxa-Δ$^{5(10),9(11)}$-estradiene-17-one 4 gm. of 4,5-seco-Δ$^9$-estrene-3,5,17-trione, a product described in French Patent No. 1,305,992, then 2.85 cc. of methyl orthoformiate are introduced into 4 cc. of methanol under an atmosphere of nitrogen. The mixture is agitated for 15 minutes at a temperature between 0 and +5° C. 0.001 gm. of paratoluene sulfonic acid is then introduced and the agitation is maintained for 15 hours at a temperature between 0 and +5° C. The temperature of the reaction medium is brought to 20° C. and agitation is continued for 2 hours at this temperature. The pH of the reaction medium is then brought to 8.0 by adding triethylamine. The whole is poured into water, extracted with methylene chloride and the isolation is completed as in the preceding example.

Accordingly, 3 - methyl - 3 - methoxy-4-oxa-Δ$^{5(10),9(11)}$-estradiene-17-one is obtained.

As far as is known, this product is not described in the literature.

Example 3.—Preparation of 3-methyl-3-ethoxy-4-oxa-Δ$^{5(10),9(11)}$-estradiene-17-one 30 gm. of 4,5-seco-Δ$^9$-estrene-3,5,17-trione, a product described in French Patent No. 1,305,992, then 36 cc. of ethyl orthoformiate are introduced into 30 cc. of ethanol under an atmosphere of nitrogen. This mixture is agitated for 15 minutes between 0 and +5° C. 0.0075 gm. of para-toluene sulfonic acid is then introduced and the agitation is maintained for 16 hours at a temperature between 0° and +5° C. Thereafter, the temperature of the reaction mixture is brought to +20°, +25° C. and maintained for 2 hours. The pH of the reaction medium is brought to 8.0 by adding triethylamine and the whole is poured into water and agitated for 15 minutes at room temperature. The aqueous mixture is extracted with methylene chloride, and the methylene chloride extracts are combined. The obtained solution is washed with water and dried. To this methylene chloride solution, 30 gm. of magnesium silicate are added while agitating. The magnesium silicate is filtered off and the solution is concentrated to dryness under reduced pressure under an atmosphere of nitrogen to obtain 35.4 gm. of crude 3-methyl - 3-ethoxy-4-oxa-Δ$^{5(10),9(11)}$-estradiene-17-one, containing a small amount of ethyl orthoformiate.

N.M.R. spectrum:
Methyl in 13 position—at 54 hz.
Methyl of ethoxy grouping—triplet at 60–67–73.5 hz.
Methyl in the 3 position—at 86 hz.
Methyl of ethoxy grouping—quadruplet at 203–210–217–226 hz.

As far as is known, this product is not described in the literature.

Example 4.—Preparation of 3-methyl-3-ethoxy-4-oxa-13β-ethyl-Δ$^{5(10),9(11)}$-gonadiene-17-one 11.6 gm. of 13β-ethyl-4,5 - seco - Δ$^9$ - gonene-3,5,17-trione are introduced at a temperature between 0 and +5° C. into a mixture of 11.6 cc. of ethanol and 13.8 cc. of ethyl orthoformiate. The mixture is agitated for 15 minutes. Then 2.8 mg. of para-toluene sulfonic acid are added. The agitation is maintained for 15 hours at a temperature between 0 and +5° C. under an atmosphere of nitrogen. The temperature of the reaction medium is brought to 20° C. and the whole is agitated for one hour at 20° C. The pH of the reaction medium is brought to 8.0 by adding triethylamine. Water and methylene chloride are added and the mixture agitated. The organic phase is decanted off. The aqueous phase is extracted with methylene chloride. The methylene chloride extracts are combined with the main organic phase. The obtained methylene chloride solution is washed with water, dried and concentrated to dryness under reduced pressure.

Thus, 13.4 gm. of 3-methyl - 3 - ethoxy-4-oxa-13β-ethyl-Δ$^{5(10),9(11)}$-gonadiene-17-one are obtained.

I. R. spectrum:
Presence of ketone in the 17 position
Band at 1653 cm.$^{-1}$ corresponding to

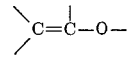

Presence of

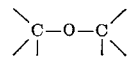

As far as is known, this product is not described in the literature.

The 13β-ethyl - 4,5 - seco - Δ$^9$-gonene-3,5,17-trione, used as starting material in the above example, is prepared in the following way:

A sulfochromic acid solution is prepared by dissolving 27.5 gm. of chromic acid in a mixture of 60.5 cc. of water and 20.6 cc. of an aqueous solution of 66° Bé. sulfuric acid. On the other hand, 106 gm. of crude 13β-ethyl-4,5-seco - Δ$^9$ - gonene - 17β-ol-3,5-dione, described in Belgian Patent No. 657,260 (an oily product obtained in paragraph 4 of stage F, after the acid hydrolysis, prior to the chromatography through magnesium silicate) are dissolved in 1,060 cc. of acetone, under an atmosphere of nitrogen. The solution is cooled to −10° C. and the previously prepared sulfochromic acid solution is introduced with agitation at −10° C. in about 15 minutes. The mixture is agitated for one hour at −10° C.; then a mixture of 53 cc. of an aqueous solution of 35° Bé. sodium bisulfite and 159 cc. of water is intrdduced at a temperature between 0 and +5° C. The mixture is agitated for 15 minutes at a temperature between 0 and +5° C. Acetone is distilled off under reduced pressure and water is added. The aqueous phase is extracted with methylene chloride. The extracts are combined and the obtained organic solution is washed with water, then with an aqueous solution of sodium bicarbonate, and finally with water.

The organic solution is dried, concentrated to dryness under reduced pressure to obtain 98 gm. of crude product. This crude product is chromatographed through magnesium silicate. By eluting with methylene chloride, there is obtained a fraction which, after triturating in an ethyl ether-isopropyl ether mixture provides a first yield of 27.5 gm. of crystals having a melting point of 85° to 86° C. The elution is continued with methylene chloride containing 0.5% of methanol. The obtained solution is combined with the ethereal mother liquors of purification from the first yield and concentrated to dryness. The obtained residue is chromatographed through magnesium silicate and, first, eluted with a benzene-cyclohexane mixture (1 to 2) so as to eliminate an oily fraction, then with methylene chloride containing 1% of methanol to provide a second fraction, which, purified by triturating in ether, provides a second yield of 7.3 gm. of crystals having a melting point of 85° to 86° C. When the elution is continued with methylene chloride, a third fraction is obtained which, upon purification by crystallization from ether, provides a third yield of 13.66 gm. of crystals having a melting point of 85 to 86° C.

Accordingly, there are obtained, as a whole, 48.46 gm. of 13β - ethyl - 4,5 - seco-Δ⁹-gonene-3,5,17-trione, having a melting point of 85° to 86° C. and a specific rotation $[\alpha]^{20}_D = +21° \pm 1°$ (c.=1.1% in methanol).

U. V. Spectrum (ethanol): λ max. at 248–249 mμ ε=14,700.

As far as is known, this product is not described in the literature.

Example 5.—Preparation of 1,3 - dimethyl - 3 - ethoxy-4-oxa-17β-acetoxy-Δ⁵⁽¹⁰⁾,⁹⁽¹¹⁾-estradiene Proceeding in the same manner as in Example 1, and starting from 1-methyl - 17β - acetoxy-4,5-seco-Δ⁹-estrene-3,5 - dione there is obtained 1,3-dimethyl-3-ethoxy-4-oxa-17β-acetoxy-Δ⁵⁽¹⁰⁾,⁹⁽¹¹⁾-estradiene.

As far as is known, this product is not described in the literature.

The starting product, 1-methyl 17β-acetoxy 4,5-secoΔ⁹-estrene 3,5-dione, may be prepared as follows: 19.71 gm. of 1-acetoxy 2-methyl 4-pentanone are treated with 44 cc. of a 40% aqueous solution of hydrobromic acid. The mixture is heated to 125° C. and distilled over. The aqueous phase is extracted with ether and the ether distilled off. 14.3 gm. of 1-bromo 2-methyl 4-pentanone are obtained which, upon treatment with ethylene-glycol in the presence of p-toluenesulfonic acid gives 1-bromo 2-methyl 4,4-ethylene-dioxy pentane which appears in the form of a colorless liquid. Boiling point: 61° C. under 1.4 mm./Hg.

1-bromo 2-methyl 4,4-ethylenedioxy pentane, when submitted to the action of magnesium in tetrahydrofuran, gives a solution of the corresponding magnesium compound which is reacted with the δ-lactone of dextrorotatory 1β-acetoxy 4-(2'-carboxyethyl)-7α,β-methyl 3aα,4β,7,7a-tetrahydroindane 5-ol, described in U.S. patent application Ser. No. 361,872 filed Apr. 22, 1964, now Pat. No. 3,413,314. By applying the process described in this patent application 1-methyl 17β-acetoxy-4,5-seco-Δ⁹-estrene 3,5-dione may be obtained.

Example 6.—Preparation of 3,6α-dimethyl-3-ethoxy-4-oxa-17β-acetoxy-Δ⁵⁽¹⁰⁾,⁹⁽¹¹⁾-estradiene Proceeding in the same manner as in Example 1, and starting from 6α-methyl-17β-acetoxy-4,5-seco-Δ⁹-estrene-3,5-dione, described in C.R. 1967 (2), Serie C, p. 1396, there is obtained 3,6α-dimethyl-3-ethoxy-4-oxa-17β-acetoxy-Δ⁵⁽¹⁰⁾,⁹⁽¹¹⁾-estradiene.

As far as is known, this product is not described in the literature.

Example 7.—Preparation of 3,7α-dimethyl-3-ethoxy-4-oxa-Δ⁵⁽¹⁰⁾,⁹⁽¹¹⁾-estradiene-17-one Proceeding in the same manner as in Example 3, and starting from 7α-methyl-4,5-seco-Δ⁹-estrene-3,5,17-trione, described in French Patent No. 1,456,779, there is obtained 3,7α-dimethyl-3-ethoxy-4-oxa - Δ⁵⁽¹⁰⁾,⁹⁽¹¹⁾ - estradiene-17-one.

As far as is known, this product is not described in the literature.

Example 8.—Preparation of 2,3-dimethyl-3-ethoxy-4-oxa-17β-benzoyloxy-Δ⁵⁽¹⁰⁾,⁹⁽¹¹⁾-estradiene Proceeding in the same manner as in the Example 1, and starting from 2-methyl-17β-benzoyloxy-4,5-seco-Δ⁹-estrene-3,5-dione, described in French Patent No. 1,284,566, there is obtained 2,3-dimethyl-3-ethoxy-4-oxa-17β-benzoyloxy-Δ⁵⁽¹⁰⁾,⁹⁽¹¹⁾-estradiene.

As far as is known, this product is not described in the literature.

Example 9.—Preparation of 3-methyl-3-ethoxy-4-oxa-13β-propyl-Δ⁵⁽¹⁰⁾,⁹⁽¹¹⁾-gonadiene 17-one Using the process described in Example IV but starting from 13β-propyl-4,5-seco-Δ⁹-gonene-3,5,17-trione, 3-methyl-3-ethoxy-4-oxa-13β-propyl-Δ⁵⁽¹⁰⁾,⁹⁽¹¹⁾ - gonadiene - 17-one is obtained.

Infrared spectra:
Presence of 17 keto group
Presence of a band at 1653 cm.⁻¹ corresponding to the

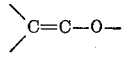

group
Presence of the

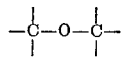

group.

As far as is known, this compound is not described in the literature.

The starting product, 13β-propyl-4,5-seco-Δ⁹-gonene-3,5,17-trione is prepared using the process described in Example IV starting from 13β-propyl-4,5-seco-Δ⁹-gonene-17β-ol-3,5-dione described in the Belgian Patent 657,260.

The 13β-propyl-4,5-seco-Δ⁹-gonene-3,5,17-trione melts at 109° C.; $[\alpha]_D^{20} = +31° \pm 2°$ (c.=0.5% in methanol).

As far as is known, this compound is not described in the literature.

EXAMPLES FOR THE USE OF COMPOUNDS OF FORMULA I

Example 10.—Preparation of 17β-benzoyloxy-4,5-seco-Δ⁹,¹¹-estradiene-3,5-dione

Stage A.—11-bromo-17β-benzoyloxy-4,5-seco - Δ⁹ - estrene-3,5-dione: 20 gm. of crude 3-methyl-3-ethoxy-4-oxa-17β-benzoyloxy - Δ⁵⁽¹⁰⁾,⁹⁽¹¹⁾ - estradiene, described in Example 1, then 15.5 gm. of anhydrous sodium acetate are dissolved in 200 cc. of dimethylformamide under an inert atmosphere. 60 cc. of a 10% by weight solution of bromine in dimethylformamide are added over a period of about one hour with agitation. The agitation is then continued for 15 minutes at room temperature. The obtained suspension is poured into a water-ice-methylene chloride mixture. The suspension is stirred and the organic phase is decanted off. The aqueous phase is extracted with methylene chloride. The methylene chloride extracts are combined with the main organic solution. Then, the obtained organic solution is washed with water, then with an aqueous solution of sodium bicarbonate, and finally with water. The solution is dried and concentrated to dryness under reduced pressure, under an atmosphere of nitrogen. Isopropyl ether is added to the obtained residue. The formed precipitate is filtered with suction to obtain 25.6 gm. of crude 11-bromo-17β-benzoyloxy-4,5-seco-Δ⁹-estrene-3,5-dione, used as such for the next stage.

As far as is known, this product is not described in the literature.

Stage B.—17β-benzoyloxy-4,5-seco-Δ⁹,¹¹-estradiene-3,5-dione: 20 gm. of anhydrous lithium bromide and 20 gm. of lithium carbonate are introduced under inert atmosphere into 300 cc. of dimethylformamide. The temperature of the reaction mixture is brought to 95° C. and 25.65 gm. of crude 11-bromo-17β-benzoyloxy-4,5-seco-Δ⁹-estrene-3,5-dione, suspended in 39 cc. of dimethylformamide are introduced. The reaction medium is agitated for 18 hours under inert atmosphere. The temperature of the reaction mixture is then brought to 20° C. and, slowly, the mixture is poured into a water-ice-acetic acid mixture. Agitation is maintained for 30 minutes. Then the aqueous phase is extracted with methylene chloride. The methylene chloride extracts are combined. The combined organic solution is washed with water, then with an aqueous solution of sodium bicarbonate and finally with water. The solution is dried, and 40 gm. of magnesium silicate are slowly added thereto. Agitation is continued for 30 minutes. The magnesium silicate is then filtered off and the solution is concentrated to dryness under reduced pressure under at atmosphere of nitrogen. Sulfuric ether is added to the obtained residue. With agitation, the temperature is maintained for 15 hours between 0° C. and +5° C. The formed precipitate is then filtered off with suction and dried to obtain 3.98 gm. of 17β-benzoyloxy - 4,5 - seco-$\Delta^{9,11}$-estradiene-3,5-dione, having a melting point of 136° C. and a specific rotation $[\alpha]_D = -33° \pm 3°$ (c.=0.5% ethanol).

U.V. spectrum (ethanol): λ max. 290 mμ   ε=25,400.

This product, when admixed with 17β-benzoyloxy-4,5-seco-$\Delta^{9,11}$-estradiene-3,5-dione, which is prepared according to the process described in French Patent No. 1,380,-414, does not give a depression of the melting point.

By cyclization in an alkaline medium according to the process described in French Patent 1,380,414, 17β-benzoyloxy-4,5-seco-$\Delta^{9,11}$-estradiene - 3,5 - dione provides 17β-benzoyloxy-$\Delta^{4,9,11}$-estratriene-3-one, described in the said patent. This triene compound is endowed with a high anabolizing and androgenic activity.

Example 11.—Preparation of 17α-ethynyl-$\Delta^{4,9}$-estradiene-17β-ol-3-one

State A.—3-methyl-3-ethoxy-4-oxa-17α - ethynyl-$\Delta^{5(10),9(11)}$-estradiene-17β-ol: Acetylene is bubbled for 2 hours 20° C. through 142 cc. of a solution of sodium tert.-amylate, containing 4.59 gm. of sodium per hundred cc. to form sodium acetylide. Thereafter, a solution of 30 gm. of crude 3 - methyl-3-ethoxy-4-oxa-$\Delta^{5(10),9(11)}$-estradiene-17-one, described in Example 3, in 68 cc. of toluene is introduced. The mixture is agitated for 4 hours at room temperature while bubbling acetylene therethrough. Then, the reaction medium is brought to +10° C. and a solution of 30 gm. of ammonium chloride in 120 cc. of water is slowly introduced under an atmosphere of nitrogen. The whole is agitated for one hour at room temperature. The toluene is then eliminated under reduced pressure under an atmosphere of nitrogen. The aqueous phase is extracted with methylene chloride. The methylene chloride extracts are combined and the obtained organic solution is washed with water, dried, decolorized with animal charcoal, concentrated to dryness under reduced pressure under an atmosphere of nitrogen to obtain 34.6 gm. of crude 3-methyl-3-ethoxy-4-oxa-17α-ethynyl-$\Delta^{5(10),9(11)}$-estradiene-17β-ol, used as such for the following stage.

As far as is known, this product is not described in the literature.

Stage B.—17α-ethynyl-4,5-seco-$\Delta^9$-estrene - 17β-ol-3,5-dione: 20 gm. of crude 3-methyl-3-ethoxy-4-oxa-17α-ethynyl-$\Delta^{5(10),9(11)}$-estradiene-17β-ol are dissolved in 120 cc. of acetone containing 20% of water by volume, under an atmosphere of nitrogen. 20 cc. of an aqueous solution of 2N hydrochloric acid are added and the solution is agitated for 2½ hours at room temperature. The pH of the reaction medium is then brought to 8.0 to 8.5 by adding an aqueous solution of sodium bicarbonate. The acetone is distilled off under reduced pressure and the aqueous phase extracted with methylene chloride. The methylene chloride extracts are combined. The obtained organic solution is washed with water, dried, and 20 gm. of magnesium silicate are slowly added thereto, then filtered off. The obtained solution is concentrated to dryness under reduced pressure and under an atmosphere of nitrogen. The residue is admixed with sulfuric ether, taken to reflux for 15 minutes, cooled between 0 and +5° C. and filtered with suction to obtain 5.88 gm. of 17α-ethynyl-4,5-seco-$\Delta^9$-estrene-17β-ol-3,5-dione having a melting point of 124° C. and a specific rotation $[\alpha]_D = -73° \pm 2.5°$ (c.=0.6% in methanol).

U.S. spectrum (ethanol): λ max at 248 to 249 mμ  ε=15,000.

This product, admixed with 17α-ethynyl-4,5-seco-$\Delta^9$-estrene-17β-ol-3,5-dione, which is obtained according to the process described in French Patent 1,497,593, does not give any depression of the melting point.

Stage C.—17α - ethynyl - $\Delta^{4,9}$-estradiene-17β-ol-3-one: 0.600 gm. of 17α-ethynyl-4,5-seco-$\Delta^9$-estrene-17β-ol-3,5-dione are introduced into 2.2 cc. of benzene under an inert atmosphere. Then, at temperatures between 0° C. and +3° C., and in 20 minutes, 1.4 cc. of a solution of sodium tert.-amylate in toluene, containing 2.45 gm. of sodium per hundred cc., are added thereto. The whole is agitated for 2 hours, while maintaining the temperature in the above-mentioned range. Thereafter one cc. of benzene, then a mixture of 0.3 cc. of tert.butyl alcohol and 0.5 cc. of benzene is added. The temperature is allowed to rise to 20° C. and the whole is agitated for one hour at this temperature. The pH is adjusted to 7 by adding a benzene solution of acetic acid. The mixture is agitated for 45 minutes and water is then added. The solvents are eliminated under reduced pressure. The precipitate formed is filtered with suction, washed and dried, to obtain 570 mg. of a product melting at 178° C.

This product is purified by crystallization from ethyl acetate to obtain 416 mg. of 17α-ethyl-$\Delta^{4,9}$-estradiene-17β-ol-3-one, having a melting point of 183° C. and a specific rotation $[\alpha]_D = 355°$ (c.=0.2% in methanol).

U.V. spectrum (ethanol):
 λmax. at 215 mμ   ε=5,850
 infl. 235–236 mμ   ε=4,590
 infl. 247 mμ   ε=3,550
 λmax. at 304 mμ   ε=20,000

This preparation of 17α-ethynyl-$\Delta^{4,9}$-estradiene-17β-ol-3-one is described in French Patent 1,497,593.

From the thus prepared 17α-ethynyl-$\Delta^{4,9}$-estradiene-17β-ol-3-one, there is obtained, by applying the process which is described in U.S. Patent 3,136,790; 17α-ethynyl-$\Delta^{5(10)}$-estrene-17β-ol-3-one, which is a well known progestative agent.

Example 12.—Preparation of 13β-ethyl-17α-ethynyl-$\Delta^{4,9}$-gonadiene-17β-ol-3-one Stage A.—3-methyl-3-ethoxy-4-oxa-13β-ethyl-17α-ethynyl-$\Delta^{5(10),9(11)}$-gonadiene-17β-ol: Acetylene is bubbled for 2 hours at room temperature through 61 cc. of a toluene solution of sodium tert.-amylate containing 2.7 gm. of sodium per hundred cc., so as to form sodium acetylide. A solution of 4 gm. of 3-methyl-3-ethoxy-4-oxa-13β-ethyl-$\Delta^{5(10),9(11)}$-gonadiene-17-one, prepared according to Example 4, in 8 cc. of toluene, is slowly introduced. The mixture is then agitated for 6 hours at room temperature while bubbling acetylene therethrough. The temperature of the reaction medium is brought to +10° C. and a solution of 4 gm. of ammonium chloride in 16 cc. of water is slowly introduced, without exceeding a temperature of +15° C. The solution is then agitated for 30 minutes under an atmosphere of nitrogen. Toluene is distilled off under reduced pressure and under an atmosphere of nitrogen. The aqueous phase is extracted with methylene chloride. The methylene chloride extracts are combined; the combined organic solution is washed with water, dried, decolorized with animal charcoal and concentrated to dryness under reduced pressure and under an atmosphere of nitrogen to obtain 4.21 gm. of crude 3 - methyl - 3 - ethoxy - 4 - oxa - 13β - ethyl - 17α - ethynyl-$\Delta^{5(10),9(11)}$-gonadiene-17β-ol, used as such for the next stage.

As far as is known, this product is not described in the literature.

Stage B.—13β-ethyl-17α-ethynyl - 4,5-seco-$\Delta^9$-gonene-17β-ol-3,5-dione: 0.6 gm. of crude 3-methyl-3-ethoxy-4-oxa-13β-ethyl-17α-ethynyl-$\Delta^{5(10),9(11)}$-gonadiene-17β-ol is dissolved in 3.6 cc. of acetone containing 20% of water by volume, under an atmosphere of nitrogen. 0.6 cc. of an aqueous solution of 2 N hydrochloric acid is added. The mixture is agitated for 4 hours at room temperature and, thereafter, the reaction mixture is slowly poured into water. The aqueous phase is extracted with methylene chloride. The methylene chloride extracts are combined. The obtained organic solution is washed with water, then with an aqueous solution of sodium bicarbonate and finally with water. The solution is dried. 1.2 gm. of magnesium silicate is slowly added with agitation. The magnesium silicate is then filtered off and the solution is concentrated to dryness under reduced pressure and under an atmosphere of nitrogen. The residue is admixed with ethyl ether and cooled to 0° to +5° C. The precipitate formed is filtered with suction and dried to obtain 0.12 gm. of 13β-ethyl-17α-ethynyl-4,5-seco-Δ$^9$-gonene-17β-ol-3,5-dione, having a melting point of 128° to 129° C.

A sample of this product crystallized from ethyl ether has a melting point of 129°–130° C. and a specific rotation $[\alpha]_D = -95° \pm 2°$ (c.=1% in methanol).

Analysis.—Calculated for $C_{21}H_{28}O_3$ (percent), molecular weight=328.43: C, 76.79; H, 8.59. Found (percent): C, 77.1; H, 8.9.

U.V. spectrum (ethanol):
 λmax. at 249 mμ  ε=14,900.

As far as is known, this product is not described in the literature.

Stage C.—13β-ethyl-17α-ethynyl-Δ$^{4,9}$-gonadiene-17β-ol-3-one: From 13β-ethyl-17α-ethynyl-4,5-seco-Δ$^9$-gonene-17β-ol-3,5-dione and proceeding according to the process which is described in French Patent 1,497,593, that is, by using a mode of operation similar to that of Stage C in Example 11, there is obtained 13β-ethyl-17α-ethynyl-Δ$^{4,9}$-gonadiene-17β-ol-3-one, having a melting point of 130° C. and a specific rotation $[\alpha]_D = -368° \pm 4°$ (c.=4.5% in methanol).

U.V. spectrum (ethanol):
 λmax. at 306 mμ  ε=20,700
 infl. at 235 mμ  ε=4,850

From the thus prepared 13β-ethyl-17α-ethynyl-Δ$^{4,9}$-gonadiene-17β-ol-3-one, there is obtained, by applying the process which is described in U.S. Patent 3,136,790, 13β-ethyl-17α-ethynyl-Δ$^{5(10)}$-gonene-17β-ol-3-one, which is a very active progestomimetic agent.

Example 13.—Preparation of 13β-ethyl-Δ$^{4,9,11}$-gonatriene-3,17-dione

Stage A.—13β-ethyl-4,5-seco-Δ$^{9,11}$-gonadiene-3,5,17-trione: 13.4 gm. of 3-methyl-3-ethoxy-4-oxa-13β-ethyl-Δ$^{5(10),9(11)}$-gonadiene-17-one, described in Example 4, are dissolved in a mixture of 38 cc. of dimethylformamide and 0.8 cc. of water, under an inert atmosphere. Then, N-bromosuccinimide (about 6.4 gm.) is introduced at a temperature between 0° and +5° C., until obtention of a slight excess of bromine, which is detectable with starch-potassium iodide paper. The mixture is agitated for a further 15 minutes at a temperature between 0° and +5° C. The obtained 11-bromo-13β-ethyl-4,5-seco-Δ$^9$-gonene-3,5,17-trione is not isolated from the reaction medium.

6.33 gm. of lithium carbonate and 3.16 gm. of lithium bromide are added to the reaction medium. The temperature of the reaction medium is then raised to 95° C. over a period of approximately 30 minutes. Then, the whole is agitated at 95° C. under an inert atmosphere for 3 hours. The reaction mixture is cooled to 20° C. and slowly poured into a water-ice-acetic acid mixture. The formed precipitate is extracted with methylene chloride. The methylene chloride extracts are combined, and the obtained organic solution is washed with water and dried. To the obtained solution, 25 gm. of magnesium silicate are slowly added with agitation, and the solution is agitated for a further 15 minutes. Then, the magnesium silicate is filtered off and the solution is concentrated to dryness under reduced pressure under an atmosphere of nitrogen. The residue obtained is admixed with ethyl ether, taken to reflux, then cooled to between 0° and +5° C. The formed precipitate is filtered with suction to obtain 6.95 gm. of 13β-ethyl-4,5-seco-Δ$^{9,11}$-gonadiene-3,5,17-trione, having a melting point of 128° C.

A sample of this product purified by crystallizing from methanol has a melting point of 129° to 130° C. and a specific rotation $[\alpha]_D = -64° \pm 1.5°$ (c.=1% in methanol).

Analysis.—Calculated for $C_{19}H_{24}O_3$ (percent), molecular weight=300.38: C, 75.96; H, 8.05. Found (percent): C, 75.8; H, 8.1.

U.V. spectrum (ethanol): λmax. at 290 mμ  ε=23.800.

As far as is known, 11-bromo-13β-ethyl-4,5-seco-Δ$^9$-gonene-3,5,17-trione and 13β-ethyl-4,5-seco-Δ$^{9,11}$-gonadiene-3,5,17-trione are not described in the literature.

Stage B.—13β-ethyl-Δ$^{4,9,11}$-gonatriene-3,17-dione: 1 gm. of 13β-ethyl-4,5-seco-Δ$^{9,11}$-gonadiene-3,5,17-trione is introduced, under an inert atmosphere, into 8 cc. of a methanolic solution of potassium hydroxide, containing 5 gm. per hundred cc. and previously freed from oxygen by bubbling an inert gas therethrough. The reaction mixture is agitated for an hour and a half at 25° to 30° C. Then, the reaction mixture is neutralized by adding acetic acid and poured into a water-ice-mixture. The formed precipitate is filtered with suction, washed and dried to obtain 0.89 gm. of 13β-ethyl-Δ$^{4,9,11}$-gonatriene-3,17-dione, having a melting point of 140° C. and a specific rotation $[\alpha]_D = +200° \pm 3.5°$ (c.=0.5% in chloroform).

A sample of this product purified by crystallization form ethanol has a melting point of 145° C. and a specific rotation $[\alpha]_D^{20} = +202°$ (c.=0.54% in chloroform).

U.V. spectrum (ethanol). λmax. at 339 mμ  ε=29,550.

This product is identical to that obtained in Belgian Patent No. 674,178 and U.S. patent application Ser. No. 517,061 filed Dec. 28, 1965, now Patent No. 3,453,267.

From the 13β-ethyl-Δ$^{4,9,11}$-gonatriene-3,17-dione thus prepared, there is obtained, by applying the process which is described in Belgian Patent No. 679,368, the 13β-ethyl-17α-ethynyl-Δ$^{4,9,11}$-gonatriene-17β-ol-3-one, which is a strongly active progestomimetic agent.

Example 14.—Preparation of 13β-propyl-Δ$^{4,9,11}$-gonatriene-3,17-dione

Using the process described in Example 13, Stage A, first by subjecting the 3-methyl-3-ethoxy-4-oxa-13β-propyl-Δ$^{5(10),9(11)}$-gonadiene-17-one, obtained in Example 9, to selective bromination in position 11, 11-bromo-13β-propyl-4,5-seco-Δ$^9$-gonene-3,5,17-trione is obtained, then by dehydrobromination with a basic agent, 13β-propyl-4,5-seco-Δ$^{9,11}$-gonadiene-3,5,17-trione is obtained, F.=89° C. $[\alpha]_D^{20} = -59°5 \pm 1°5$ (c.=0.95% in methanol).

As far as is known, 11-bromo-13β-propyl-4,5-seco-Δ$^9$-gonen-3,5,17-trione and 13β-propyl-4,5-seco-Δ$^{9,11}$-gonadiene3,5,17-trione are not described in the literature.

Then, using the process described in Example 13, Stage B, but starting from 13β-propyl-4,5-seco-Δ$^{9,11}$-gonadiene-3,5,17-trione, 13β-propyl-Δ$^{4,9,11}$-gonatriene-3,17-dione is obtained, F.=125° C., $[\alpha]_D^{20} = +250° \pm 3°$ (c.=1%, methanol).

This product is identical to that described in the Belgian Patent 664,389.

The preceding specific embodiments are illustrative of the practice of the invention. It is to be understood, however, that other expedients known to those skilled in the art may be employed without departing from the spirit of the invention.

We claim:
1. A 4-oxa steroid of the formula wherein R and R' represent lower alkyl, R" and R'"
represent a member selected from the group consisting of
hydrogen, α-lower alkyl and β-lower alkyl, $R^{iv}$ and $R^v$
represent a member selected from the group consisting
of hydrogen, α-methyl and β-methyl, Y represents a member selected from the group consisting of O, $$\diagdown OR^{vi} \diagdown COCH_3$$
$$\diagup R^{vii}, \text{ and } \diagup R^{viii}$$

wherein $R^{vi}$ represents a member selected from the group
consisting of hydrogen, lower alkyl and the acyl of an
organic carboxylic acid having 1 to 1 carbon atoms, $R^{vii}$
represents a member selected from the group consisting of
hydrogen, lower alkyl, lower alkenyl, lower alkynyl and
lower halo-alkynyl, and $R^{viii}$ represents a member selected from the group consisting of hydrogen and methyl.

2. The 4-oxa steroid of claim 1 wherein R is methyl, R'
is ethyl, R" is hydrogen, R'" is hydrogen, $R^{iv}$ is hydrogen,
$R^v$ is hydrogen and Y is $$\diagdown O \text{ benzoyl}$$
$$\diagup H$$

3. The 4-oxa steroid of claim 1 wherein R is methyl,
R' is methyl, R" is hydrogen, R'" is hydrogen, $R^{iv}$ is hydrogen, $R^v$ is hydrogen, and Y is O.
4. The 4-oxa steroid of claim 1 wherein R is methyl,
R' is ethyl, R" is hydrogen, R'" is hydrogen, $R^{iv}$ is hydrogen, $R^v$ is hydrogen, and Y is O.
5. The 4-oxa steroid of claim 1 wherein R is ethyl,
R' is ethyl, R" is hydrogen, R'" is hydrogen, $R^{iv}$ is hydrogen, $R^v$ is hydrogen, and Y is O.
6. The 4-oxa steroid of claim 1 wherein R is methyl,
R' is ethyl, R" is hydrogen, R'" is hydrogen, $R^{iv}$ is hydrogen, $R^v$ is hydrogen, and Y is $$\diagdown OH$$
$$\diagup C\equiv CH$$

7. The 4-oxa steroid of claim 1 wherein R is ethyl,
R' is ethyl, R" is hydrogen, R'" is hydrogen, $R^{iv}$ is hydrogen, $R^v$ is hydrogen, and Y is $$\diagdown OH$$
$$\diagup C\equiv CH$$

8. A process for the production of the 4-oxa steroid
of claim 1 which comprises the steps of reacting a 3,5-
dioxo-4,5-seco-$\Delta^9$ steroid of the formula wherein R represents lower alkyl, R" and R'" represent
a member selected from the group consisting of hydrogen,
α-lower alkyl and β-lower alkyl, $R^{iv}$ and $R^v$ represent a
member selected from the group consisting of hydrogen,
α-methyl and β-methyl, Y represents a member selected
from the group consisting of O, $$\diagdown OR^{vi} \diagdown COCH_3$$
$$\diagup R^{vii}, \text{ and } \diagup R^{viii}$$

wherein $R^{vi}$ represents a member selected from the group
consisting of hydrogen, lower alkyl and the acyl of an
organic carboxylic acid having 1 to 7 carbon atoms, $R^{vii}$
represents a member selected from the group consisting of
hydrogen, lower alkyl, lower alkenyl, lower alkynyl and
lower haloalkynyl, and $R^{viii}$ represents a member selected
from the group consisting of hydrogen and methyl, with
a lower alkyl orthoformate of the formula $HC(OR^1)_3$
wherein $R^1$ represents lower alkyl, in the presence of an
acid agent and recovering said 4-oxa steroid.

9. The process of claim 8 wherein said lower alkyl
orthoformate is selected from the group consisting of
methyl orthoformate and ethyl orthoformate.

10. The process of claim 8 wherein said acid agent
is a strong acid selected from the group consisting of
p-toluene sulfonic acid, methane sulfonic acid, perchloric
acid and sulfuric acid.

11. The process of claim 8 wherein said reaction with
said lower alkyl orthoformate is conducted in the presence of a polar organic solvent.

12. The process of claim 11 wherein said polar organic solvent is selected from the group consisting of
methanol, ethanol and dioxane.

13. A process for the production of 17β-benzoyloxy-
4,5-seco-$\Delta^{9,11}$-estradiene - 3,5 - dione which comprises the
steps of brominating a 4-oxa steroid of claim 1 wherein
R is methyl, R' is lower alkyl, R" is hydrogen, R'" is
hydrogen, $R^{iv}$ is hydrogen, $R^v$ is hydrogen and Y is $$\diagdown O \text{ benzoyl}$$
$$\diagup H$$

in the 11 position, dehydrobrominating the resultant 11-
bromo-17β-benzoyloxy-4,5-seco-$\Delta^9$-estrene-3,5-dione and
recovering said 17β-benzoyloxy-4,5-seco-$\Delta^{9,11}$-estradiene-
3,5-dione.

14. A process for the production of 17α-ethynyl-4,5-
seco - $\Delta^9$ - estrene-17β-ol-3,5-dione which comprises the
steps of ethynylating a 4-oxa steroid of claim 1 wherein
R is methyl, R' is lower alkyl, R" is hydrogen, R'" is
hydrogen, $R^{iv}$ is hydrogen, $R^v$ is hydrogen and Y is O, by
the action of an ethynylating agent in a basic medium,
hydrolysing the resultant 3-methyl-3-lower alkoxy-17α-
ethynyl-4-oxa-$\Delta^{5(10),9(11)}$-estradiene-17β-ol in an acid medium and recovering said 17α-ethynyl-4,5-seco-$\Delta^9$-estrene-
17β-ol-3,5-dione.

15. A process for the production of 13β-ethyl-17α-
ethynyl-4,5-seco-$\Delta^9$-gonene-17β-ol-3,5 - dione which comprises the steps of ethynylating a 4-oxa steroid of claim
1 wherein R is ethyl, R' is lower alkyl, R" is hydrogen,
R'" is hydrogen, $R^{iv}$ is hydrogen, $R^v$ is hydrogen and Y
is O, by the action of an ethynylating agent in a basic
medium, hydrolysing the resultant 3-methyl-3-lower alkoxy-13β-ethyl-17α-ethynyl-4 - oxa-$\Delta^{5(10),9(11)}$-gonadiene-
17β-ol in an acid medium and recovering said 13β-ethyl-
17α-ethynyl-4,5-seco-$\Delta^9$-gonene-17β-ol-3,5-dione.

16. A process for the production of 13β-ethyl-4,5-seco-
$\Delta^{9,11}$-gonadiene-3,5,17-trione which comprises the steps of
brominating a 4-oxa steroid of claim 1 wherein R is ethyl,
R' is lower alkyl, R" is hydrogen, R'" is hydrogen, $R^{iv}$
is hydrogen, $R^v$ is hydrogen and Y is O, in the 11 position, dehydrobrominating the resultant 11-bromo-13β-ethyl-4,5-seco-$\Delta^9$-gonene-3,5,17 - trione and recovering said
13β-ethyl-4,5-seco-$\Delta^{9,11}$-gonadiene-3,5,17-trione.

17. 11-bromo-17β-benzoyloxy - 4,5 - seco-$\Delta^9$-estrene-3,
5-dione.

18. 11-bromo-13β-ethyl - 4,5 - seco - $\Delta^9$-gonene-3,5-17-
trione.

19. 13β-ethyl-17α-ethynyl-4,5-seco-$\Delta^9$ - gonene - 17β-ol-
3,5-dione.

20. 13β-ethyl-4,5-seco-Δ$^{9,11}$-gonadiene-3,5,17-trione.

21. A 3-methyl-3-lower alkoxy-13β-lower alkyl-4-oxa-Δ$^{5(10),9(11)}$-gonadiene of the formula

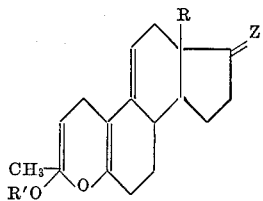

wherein R and R' represent lower alkyl and Z represents a member selected from the group consisting of O,

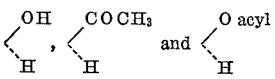

where acyl represents the acyl of a carboxylic acid selected from the group consisting of benzoic acid and lower alkanoic acid.

22. The compound of claim 21 wherein R is a lower alkyl selected from the group consisting of methyl, ethyl, propyl and butyl and R' is a lower alkyl selected from the group consisting of methyl and ethyl.

23. The 4-oxa steroid of claim 1 wherein R is propyl, R' is ethyl, R" is hydrogen, R''' is hydrogen, R$^{iv}$ is hydrogen, R$^v$ is hydrogen, and Y is O.

24. 11-bromo-13β-propyl-4,5 - seco - Δ$^9$-gonene-3,5,17-trione.

25. 13β-propyl-4,5-seco-Δ$^{9,11}$-gonadiene-3,5,17-trione.

References Cited

UNITED STATES PATENTS

| | | | |
|---|---|---|---|
| 3,085,098 | 4/1963 | Nomine et al. | 260—586 XR |
| 3,102,145 | 8/1963 | Nomine et al. | 260—586 |
| 3,138,617 | 6/1964 | Nomine et al. | 260—345.2 |
| 3,150,152 | 9/1964 | Joly et al. | 260—586 |
| 3,413,314 | 11/1968 | Amiard et al. | 260—586 XR |
| 3,422,121 | 1/1969 | Taub | 260—345.2 XR |

FOREIGN PATENTS 1,366,725  6/1964  France.

HENRY R. JILES, Primary Examiner

JOHN M. FORD, Assistant Examiner

U.S. Cl. X.R.

260—239.5, 586, 999

PO-1050 (5/69)

UNITED STATES PATENT OFFICE
CERTIFICATE OF CORRECTION

Patent No. 3,499,913  Dated March 10, 1970.

Inventor(s) Robert Joly, Julien Warnant and Jean Jolly

It is certified that error appears in the above-identified patent and that said Letters Patent are hereby corrected as shown below:

| COL. | LINE | |
|---|---|---|
| 1 | 31 | Correct the spelling of "methyl" (second occurrence) |
| 2 | 30 | Correct the spelling of "haloalkynyl" |
| 2 | 64 | After the word "member" the following words were omitted -- selected from the group consisting of hydrogen and -- |
| 5 | 17 | "$\Delta^{4911}$" should read -- $\Delta^{4,9,11}$ -- |
| 5 | 34 | "4,4-seco" should read -- 4,5-seco -- |
| 8 | 54 | Correct the spelling of "introduced" |
| 9 | 41 | Correct "7a" to read -- 7a -- |
| 11 | 27 | Correct "State" to read -- Stage -- |
| 13 | 39 | "4.5%" should be -- 0.5% -- |
| 14 | 38 | "form" should be -- from -- |
| 15 | 25 | "1 to 1" should be -- 1 to 7 -- |
| 17 | 10 | Error in formula as follows: |

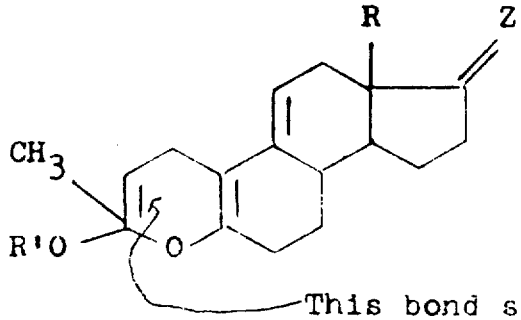

This bond should be deleted

Signed and sealed this 24th day of November 1970.

(SEAL)
Attest:

EDWARD M. FLETCHER, JR.
Attesting Officer

WILLIAM E. SCHUYLER, JR.
Commissioner of Patents